United States Patent

[11] 3,579,844

| [72] | Inventor | Arne K. Olofson |
| | | 15396 S.E. River Forest Road, Milwaukie, Oreg. 97222 |
| [21] | Appl. No. | 761,432 |
| [22] | Filed | Sept. 23, 1968 |
| [45] | Patented | May 25, 1971 |

[54] BACKING RING CENTERING DEVICE
7 Claims, 3 Drawing Figs.

[52] U.S. Cl. .................................................. 33/180, 33/161, 33/174
[51] Int. Cl. .................................................. G01b 3/38
[50] Field of Search ........................................ 33/180 (A), 180 (AU), 181 (AU), 191, 161, 174 (Q), 193, 203.2

[56] References Cited
UNITED STATES PATENTS

| 2,341,796 | 2/1944 | Kuna et al. | 33/180(AU) |
| 2,599,819 | 6/1952 | Fisher | 33/191 |
| 2,647,326 | 8/1953 | Sauer | 33/161 |
| 2,816,366 | 12/1957 | Barlow | 33/180(A) |
| 3,374,545 | 3/1968 | Monroe | 33/161 |

*Primary Examiner*—William D. Martin, Jr.
*Attorney*—Kolisch and Hartwell

ABSTRACT: A device for centering an annular backing ring within a tire casing, the device including an elongated guide supported against diametrically opposed regions of a bead on the casing and an indicator bar mounted for movement relative to the guide. The indicator bar may be moved into contact with diametrically opposite internal regions of the backing ring and cooperating graduations and marker on the guide and bar indicate the position of the bar, and thus the position of the backing ring, relative to the guide member.

PATENTED MAY 25 1971 3,579,844

INVENTOR
ARNE K. OLOFSON
BY
Kolisch + Hartwell
ATTORNEYS

BACKING RING CENTERING DEVICE

This invention relates to a device for centering an annular backing ring within a tire casing.

In retreading tires, a curing tube or bag is placed within the tire casing and is inflated to support the casing while a new tread is applied. A rigid annular backing ring commonly is placed within the casing with the backing ring positioned radially inwardly of the curing tube. The backing ring is provided to back up and support the curing tube upon its being inflated. It is important that this backing ring be concentrically positioned with respect to the tire casing. If the backing ring is not concentric with the tire casing, the curing tube on being inflated expands nonuniformly about the circumference thereof, leading to premature failure. Curing tubes represent a considerable expense and, therefore, economical retreading may be performed only if the tubes last for their expected life.

A general object of the invention is to provide a novel centering device which permits a workman readily to center an annular backing ring within a tire casing.

Another object is to provide such a centering device which is rapidly placed in operative position by resting it on a tire, and when so positioned, permits by simple adjustments the determination of the position of the backing ring within the tire.

Yet another object of the invention is to provide a centering device which is relatively simple in operation.

In a particular embodiment of the invention the device contemplated includes a support which may be rested upon diametrically opposed regions of the bead in a tire casing to position the support relative to the casing. An indicator which is mounted for relative movement on the support may then be moved back and forth to move its ends into contact with diametrically opposite internal regions of the backing ring. Cooperating graduations and marker provided on the support and indicator are readable to determine the extent the indicator is displaced to either side of the center of the tire casing in making such contact, Various other objects and advantages will become more fully apparent as the following description is read in conjunction with the drawings, wherein:

Figure 1:
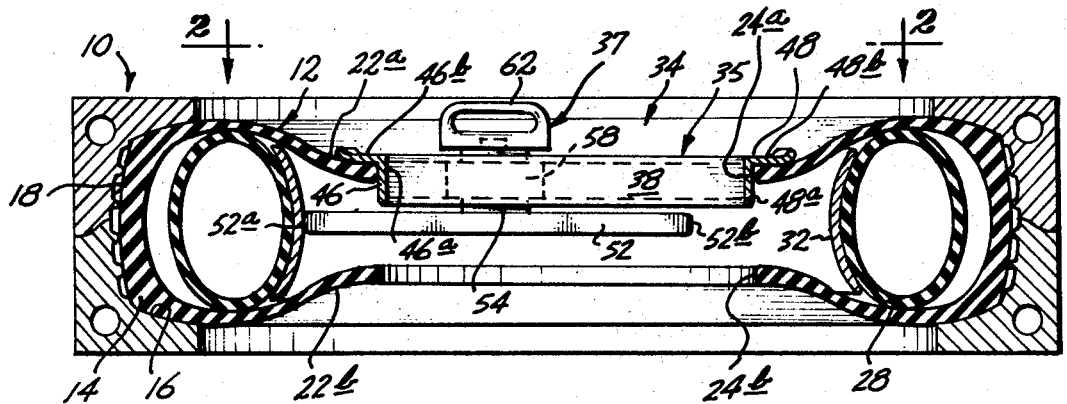
FIG. 1 is a cross-sectional view taken through a tire casing supported in a treading mold, and illustrating a centering device constructed in accordance with an embodiment of the invention.

Referring now to the drawings, and first specifically to FIG. 1, at 10 is indicated generally an annular mold supporting a tire casing 12 for retreading. The crown portion 14 of the casing, which includes the periphery of the casing, is received within an annular cavity 16 in the mold. The periphery of the casing is disposed immediately adjacent a tread design matrix 18 defined in cavity 16.

Sidewalls 22a, 22b of the tire casing, as well as beads 24a, 24b in the casing, are in an open and exposed central portion of the mold and thus, are accessible to a workman.

An inflatable curing tube 28 is inserted within the confines of the tire casing initially in a deflated state. The curing tube is constructed of an elastomeric material and is adapted to be inflated to expand and to fill the interior of the tire casing. This presses the crown portion of the casing against the tread design matrix of the mold.

A rigid annular backing ring, indicated at 32, is inserted within the tire casing in a position radially inwardly of the curing tube. The backing ring supports the inner face of the curing tube, and must be centered within the tire casing if the tube on being inflated is to expand uniformly in regions disposed circumferentially of the tube.

Figure 2:
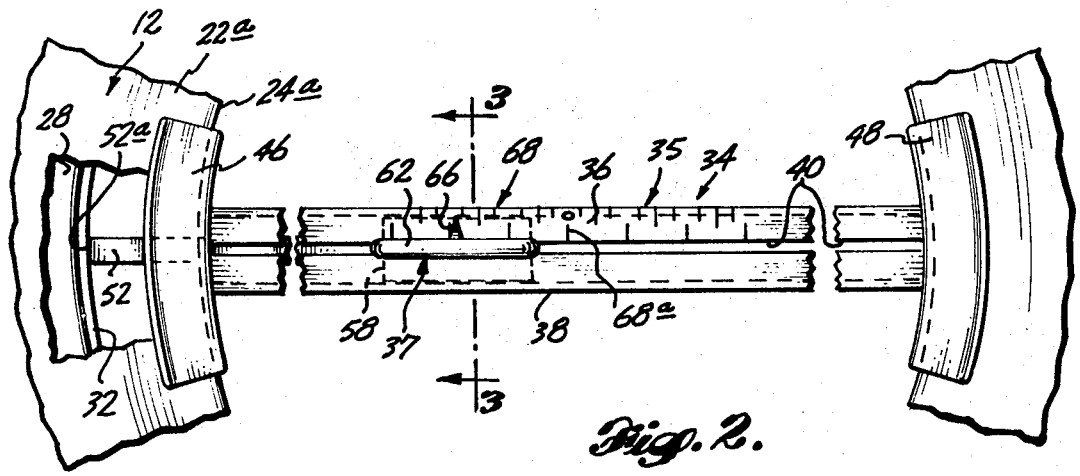
FIG. 2 is a view, somewhat enlarged, taken generally along the line 2–2 in FIG. 1.
Figure 3:
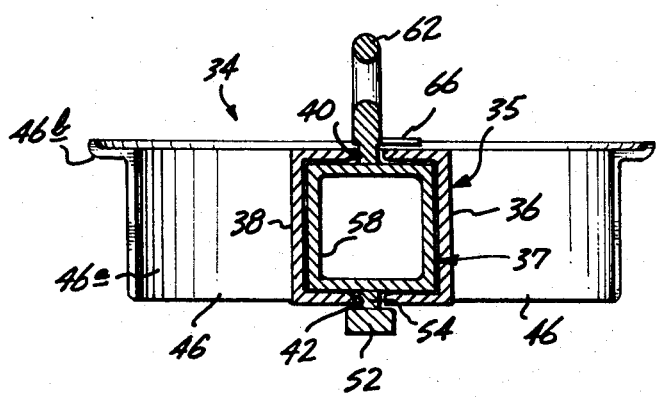
FIG. 3 is a cross-sectional view, somewhat further enlarged, taken generally along the line 3–3 in FIG. 2.

Indicated at 34 in FIGS. 1, 2 and 3, is a centering device constructed in accordance with an embodiment of the invention. Such comprises a support generally shown at 35, and an indicator generally shown at 37.

Support 35 comprises a pair of opposed elongated channels 36, 38, which collectively constitute a guide in the construction. The channels face each other, and are spaced apart somewhat to define a casing having an upper slot 40 and a lower slot 42 extending longitudinally thereof.

Channels 36, 38 are secured as by welding adjacent one set of their ends to a seating element 46, and are similarly secured adjacent their other set of ends to another seating element 48. The seating elements are similar.

As is best seen in FIG. 1, each seating element has an L-shaped cross section, formed by a downwardly extending flange 46a, to which the channels are secured, and a flange 46b, which projects outwardly from the channel members. Flange 46b forms a lip which is adapted to rest against the sidewall of a tire casing adjacent the bead in the casing. The seating element is arcuate when viewed from the top, as seen in FIG. 2, and the outer surface of flange portion 46a curves over a radius which substantially corresponds to the radius about which the bead in the tire casing curves.

Considering indicator 37, an elongated bar touch, or element 52, having ends or touch points 52a, 52b, is positioned parallel to and below channels 36, 38. A connecting member 54 is secured to and projects upwardly from bar 52 through slot 42. Member 54 is secured along its upper edge to a box-shaped member 58, illustrated in dashed outline in FIGS. 1 and 2 and in cross section in FIG. 3. Box-shaped member 58 is slidably received within the confines of channels 36, 38, and sliding movement carries indicator bar 52 along a path which is parallel to and below the channels.

A handle 62 is secured to the top of member 58 and projects upwardly therefrom through slot 40. A pointed marker 66 is secured to one side of the handle in a position overlying the top of channel 36. The marker acts in cooperation with a series of graduations indicated generally at 68, on the top of channel 36, to show the position of indicator bar 52 with respect to the channel members. With the centering device in operative position on top of a tire casing, support 35 extends diametrically across the tire with sealing elements 46, 48 at the ends of the support snugly adjacent the bead of the tire. The seating elements thus serve as supports to support the guide in a predetermined position relative to the casing. The graduation 68a in FIG. 2, which may be labeled 0, then occupies a position which is substantially centered between the portions of the tire casing spanned by the support. With positioning of handle 62 to place the marker over graduation 68a, the middle of the indicator bar becomes centered midway between the ends of channels 36, 38.

Describing how the device disclosed may be used in centering the backing ring, after the curing bag or tube has been placed within the tire casing, the backing ring is placed within the casing and approximately centered by striking different portions of the ring to move it into what appears to be a concentric position. In finally centering the ring, the centering device disclosed is employed by placing it in operative position on the tire casing with the device extending diametrically between opposed sides of the casing, as shown in FIGS. 1 and 2. With the indicator bar having a length preferably which does not exceed the length of guide 35, initial positioning of the device is facilitated by first centering the bar with respect to the guide, prior to dropping the device into place with the seating elements seating on diametrically opposed regions of the bead in the tire casing.

With the device properly seated, the indicator bar is shifted first in one direction and then in the opposite direction along the guide to bring its opposite ends into contact with diametrically opposite internal regions of the backing ring. The extent that the bar is moved in any given direction away from a centered position underneath the guide before contact with the backing ring is established is readily determined using the marker and graduations disclosed. If readings taken indicate that the backing ring is offset from a centered position in a direction paralleling the guide, the ring may then be centered by tapping it into position, using either the indicator bar itself or some other tool. The centering device then may be shifted to produce centering of the ring in a direction extending at 90° to the direction in which the ring was first centered. If no lateral shifting of the ring with respect to the device occurs during this second centering step, the backing ring then will occupy a truly concentric position in the tire casing. It may be desirable to repeat the process after again swinging the device 90° to make sure that true centering has been achieved.

While an embodiment of the invention has been described, variations are possible without departing therefrom. It is desired to cover all such modifications and variations as would be apparent to one skilled in the art and that come within the scope of the appended claims.

I claim:

1. A centering device for effecting centering of an annular backing ring disposed internally of a tire casing, comprising an elongated guide, supports at opposite ends of the guide for supporting the guide in a position extending diametrically of the casing, and indicator means mounted on said guide for movement longitudinally of said guide, said indicator means including a touch element movable longitudinally of said guide and positioned below said supports, said touch element having ends adapted to be projected beyond the ends of said guide with movement of the touch element toward opposite ends of the guide, said indicator further including a position marker for noting the position of the touch element relative to said guide.

2. The device of claim 1, wherein said touch element comprises an elongated touch bar disposed beneath and generally paralleling the guide.

3. The device of claim 1, wherein said indicator means comprises an elongated touch bar disposed under, substantially parallel to, and movable longitudinally of said guide, and a member joined to said bar movable within the interior of said guide.

4. The device of claim 3, wherein said guide comprises a casing with a slot extending along its top, and said indicator means includes a handle which projects through said slot.

5. The device of claim 1, wherein said supports comprise a pair of spaced-apart seating elements secured to said guide with one of the seating elements adjacent one end of the guide and the other seating element adjacent its other end, said seating elements being adapted to seat on diametrically opposite regions of the bead on a tire casing.

6. The device of claim 5, wherein each of said seating elements has an arcuate outer surface facing outwardly from the guide, and said outer surface has a radius which substantially corresponds to the radius of the inner surface of the bead on a tire casing.

7. The device of claim 6, wherein each of said seating elements further comprises a lip portion adapted to rest on the sidewall of a tire casing adjacent its bead.